United States Patent

Okamoto et al.

[15] 3,635,531
[45] Jan. 18, 1972

[54] ANTISKID DEVICE

[72] Inventors: Atutoshi Okamoto, Toyohashi-shi; Noriyoshi Ando, Kariya-shi; Koichi Toyama, Toyohashi-shi; Masaharu Sumiyoshi; Hisaji Nakao, both of Toyota-shi; Hisashi Watanabe, Toyohashi-shi, all of Japan

[73] Assignees: Nippondenso Kabushiki Kaisha, Kariya-shi, Aichi-ken, Japan; Toyota Jidosha Kogyo Kabushiki Kaisha, Toyota-shi, Japan

[22] Filed: Dec. 16, 1969

[21] Appl. No.: 885,469

[30] Foreign Application Priority Data

Dec. 27, 1968 Japan..........................................44/866

[52] U.S. Cl..........................303/21 CG, 188/181 A, 303/20
[51] Int. Cl. .............................................................B60t 8/12
[58] Field of Search....................188/181; 303/20, 21; 317/5; 324/160–162; 340/262–263

[56] References Cited

UNITED STATES PATENTS

| 3,362,757 | 1/1968 | Marcheron | 303/21 P |
| 3,532,392 | 10/1970 | Scharlack | 303/21 P |
| 3,532,393 | 10/1970 | Riordan | 303/21 BE |

*Primary Examiner*—Milton Buchler
*Assistant Examiner*—Stephen G. Kunin
*Attorney*—Cushman, Darby & Cushman

[57] ABSTRACT

An antiskid device comprising a skid detector composed of a peripheral wheel deceleration detecting circuit and a peripheral wheel subdeceleration detecting circuit for differentiating the output signal from said peripheral wheel deceleration detecting circuit to detect a first derivative of the peripheral wheel deceleration (referred to as the subdeceleration hereunder) which can be regarded to be inversely proportional to the adhesion coefficient of the road surface, and a braking force controlling mechanism to control the braking force to be applied to the wheel, whereby said braking force controlling mechanism is actuated when the peripheral wheel deceleration from said peripheral deceleration detecting circuits exceeds a reference value corresponding to the adhesion coefficient of road, while said reference value is varied in inverse proportion to the output from said peripheral wheel subdeceleration detecting circuit to continuously vary the operation starting point of said braking force controlling mechanism in accordance with the adhesion coefficient of road such that said braking force controlling mechanism is operated to continuously produce the braking force well suited to the adhesion coefficients of roads ranging from a dry asphalt road surface and the like where the adhesion coefficient is large to a snowy frozen road surface and the like where the adhesion coefficient is small, thereby effecting the antiskidding operation safely and efficiently.

6 Claims, 2 Drawing Figures

3,635,531

ANTISKID DEVICE

BACKGROUND OF THE INVENTION

This application describes a modification of the apparatus described in earlier copending commonly assigned application Ser. No. 832,664 filed June 12, 1969.

FIELD OF THE INVENTION

The present invention relates to antiskid devices adapted for use with passenger-conveying machines such as automobiles to prevent the so-called skid wherein the wheels lock under an excessively applied braking force and thus the vehicle skids with the wheels locked and to prevent the uncontrollability of the steering wheel and the spin or irregular gyration of the vehicle and the like due to such a skid, and more particularly the present invention relates to an antiskid device wherein the peripheral wheel deceleration signal and the peripheral wheel subdeceleration signal obtained by differentiating said deceleration signal are detected to thereby continuously control the braking force applied to the wheels by means of said two signals.

With the conventional antiskid devices for automobiles, the peripheral wheel speed is converted into an electrical quantity by means of an AC generator connected to a driving axle shaft and then said AC voltage proportioned to the peripheral wheel speed is rectified and smoothed out to be converted into a DC voltage. Then, this DC voltage is applied to a differentiator circuit whose output signal represents the time rate of change of the DC voltage due to the drop in the peripheral wheel speed upon the application of the brakes or the peripheral wheel deceleration which is the time derivative of the peripheral wheel speed, whereupon when this peripheral wheel deceleration signal exceeds a reference value corresponding to a predetermined friction coefficient between the tires and the road surface which is 0.8, the control is exercised in a direction to forcibly release the braking force being applied to the wheels irrespective of whether the driver releases the brakes applied. Thus, as the peripheral wheel deceleration drops below said reference value by virtue of said antiskid operation, the braking force is again applied to the wheels since the brakes have been continuously applied by the driver. Thereafter, this process of operation is repeated continuously to prevent the so-called skid wherein a passenger-conveying vehicle skids with the wheels being locked.

With the conventional devices described above, if the reference value for peripheral wheel deceleration is preset to a value corresponding to the friction coefficient of 0.8 between the road surface and the tires, for example, to ensure an antiskid operation which is effective on road surfaces such as a dry asphalt road where the friction coefficient between the road surface and the tires is large, even though the brakes are applied urgently on a dry asphalt road surface or the like where the friction coefficient between the road surface and the tires has a value close to or higher than 0.8, the wheels may continue to rotate with a certain peripheral deceleration by virtue of the aforesaid antiskid operation until the vehicle is brought to a halt with a result that the vehicle can be positively braked and stopped without skidding. However, if the brakes are applied urgently on a snowy frozen road surface or the like where the friction coefficient between the road surface and the tires is small, such an 0.1, in spite of the fact that the antiskid device may not be actuated before the wheels attain a peripheral deceleration which corresponds to the predetermined friction coefficient of 0.8, the wheels lock when the peripheral wheel deceleration is reached which is slightly larger than one corresponding to the friction coefficient of 0.1, and this results in the so-called skid wherein the vehicle skids with the locked wheels as well as the irregular gyration of the vehicle and the like due to the skid, which are very dangerous. These are the defects of the conventional devices. In other words, since the reference value of peripheral wheel deceleration at which the antiskid device initiates its operation is fixed to a value which corresponds to the friction coefficient of 0.8 between the road surface and the tires, these conventional devices have been open to the objection that a satisfactory antiskid operation cannot be equally ensured under different conditions, such as in the case of a dry asphalt road surface and a snowy frozen road surface where their coefficients of adhesion differ considerably from each other. Indeed, locked wheels may be avoided even on a snowy frozen road surface and the like, if the aforesaid reference value is set to a value which corresponds to the friction coefficient of 0.1 between the road surface and the tires. However, this gives rise to the problem of considerably extending the stopping distance required for the vehicle to come to a stop, and particularly this problem is so critically manifested on a dry asphalt road surface that the merit of installing the antiskid device will become null and void.

SUMMARY OF THE INVENTION

The object of the present invention is therefore to provide an antiskid device comprising a skid detector consisting of peripheral wheel deceleration detecting circuit and a peripheral wheel subdeceleration detecting circuit adapted to differentiate the output signal from said peripheral wheel deceleration detecting circuit to detect a peripheral wheel subdeceleration which may be regarded as inversely proportional to the adhesion coefficient of the road, and a braking force controlling mechanism to control the braking force being applied to the wheels, whereby when the output from the peripheral wheel deceleration detecting circuit exceeds a reference value which is controlled inversely proportional to the output from the peripheral wheel subdeceleration detecting circuit, that is a reference value controlled to correspond both accurately and continuously to the adhesion coefficients of road, said braking force controlling mechanism is actuated to control the braking force being applied to the wheels in a continuous manner.

According to the present invention, greater effectiveness is achieved in that not only the uncontrollability of the steering wheel, irregular gyration of the car body etc., due to the locked wheels may be avoided even on a snowy frozen road surface and the like where the adhesion coefficient is small, but also the stopping distance will never be extended considerably even on a dry asphalt road surface and the like where the adhesion coefficient is large, whereby the passenger-conveying vehicles can be always braked and stopped safely and efficiently in accordance with the adhesion coefficients of the road and the so-called skid wherein the passengers conveying vehicles skid with the wheels being stopped rotating can be completely prevented.

Another remarkable effect of the present invention is the provision of an antiskid device which is simple in construction and highly reliable in operation because, excepts its peripheral wheel deceleration detecting circuit, this device is not provided with any other converters that convert a physical displacement such as the peripheral speed of the driving axle shaft etc., into an electrical quantity.

DESCRIPTION OF THE PREFERRED EMBODIMENT

Figure 1:
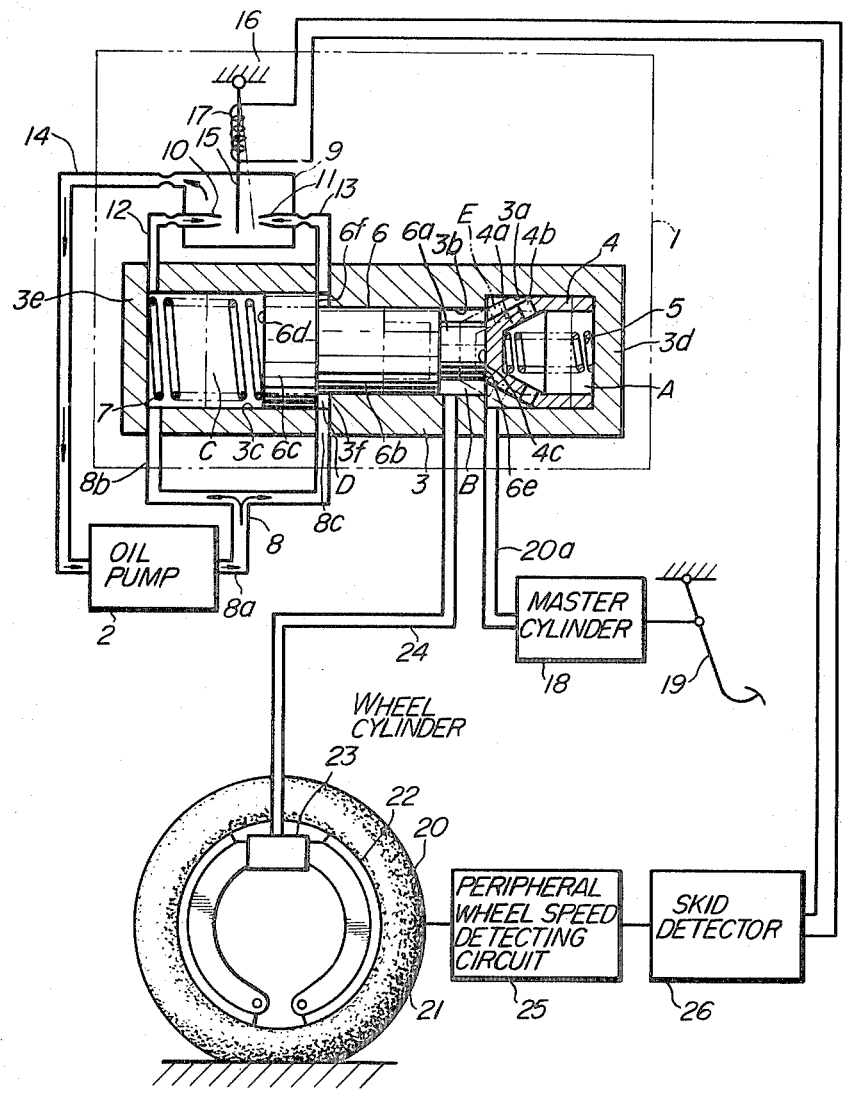
FIG. 1 is a block diagram showing an embodiment of the antiskid device according to the present invention.

Referring to FIG. 1, numeral 1 designates a braking force control valve interposed in the brake lines of a passenger-conveying vehicle such as an automobile. Numeral 2 designates an oil pump to circulate oil under pressure which provides a driving source for the control valve 1, the oil pump 2 and the oil constituting a hydraulic pressure source. And a braking force controlling mechanism is composed of this hydraulic pressure source and the control valve 1. Numeral 3 designates a cylinder body formed with axially extended cylinder sections 3a, 3b and 3c. Numeral 4 designates a bell-shaped valve inserted lengthwise and slidably within the cylinder section 3a and a hydraulic pressure hole 4b is formed through a conical portion 4a of the valve 4. Numeral 5 designates a spring to urge the valve 4 toward the cylinder section 3b and it is axially disposed with a chamber A enclosed by the bell-shaped valve 4 and an end wall 3d of the cylinder body 3. Numeral 6 designates a stepped piston-type spool having a small diameter section 6a, intermediate diameter section 6b and large diameter section 6c. Thus, the spool 6 is inserted within the cylinder body 3 such that the small diameter section 6a and the cylinder section 3b define a chamber B therebetween, the intermediate diameter section 6b slides within the cylinder section 3b and the large diameter section 6c slides within the cylinder section 3c. Numeral 7 designates a spring axially disposed within a chamber C defined by an end wall 3e of the cylinder body 3 and a base 6d of the large diameter section 6c of the spool 6, whereby the spool 6 is urged toward the valve 4 by the spring pressure of the spring so that a base 6e of the small diameter section 6a of the spool 6 is pressed against and locked by an expanded base 4c of the valve 4. Here, it is so designed that in this pressed and locked position, a chamber D is formed by an antibase side 6f of the large diameter section 6c of the spool 6 and a stepped section 3f formed along the intermediate diameter section 6b and the large diameter section 6c. Numeral 8 designates a manifold having a manifold end 8a connected to the delivery port of the oil pump 2, while manifold ends 8b and 8c are opened into the chambers C and D formed in the front and rear of the large diameter section 6c of the spool 6. Numeral 9 designates an oil tank; 10 and 11 nozzles projected into the tank 9 is opposed relation and separated from each other by a gap, the nozzle 10 being opened into the chamber C through a conduit 12 and the other nozzle 11 being communicated with the chamber D through a conduit 13. Numeral 14 designates a return conduit adapted to return to the oil pump 2 the fluid jetted into the tank 9 from the both nozzles 10 and 11 so that the fluid which would otherwise flow away to the outside of the tank may not do so. Note that the oil forced to circulate by the oil pump 2 flows in the direction shown by arrows. Numeral 15 designates a flapper having the top thereof threadedly secured to a fixed end 16 so that the free end of the flapper is positioned between the two nozzles 10 and 11 and is swingable between the nozzles 10 and 11 said flapper top as its supporting point. Numeral 17 designates a magnetic coil providing a driving source for the flapper 15 which inclines towards the nozzle 11 as shown in the figure by a two-dot chain line when the magnetic coil is energized. Numeral 18 designates a master cylinder which increases the hydraulic pressure in accordance with the magnitude of travel of a brake pedal 19. Numeral 20a designates a hydraulic pressure feedpipe having one end connected to the hydraulic pressure delivery port of the master cylinder 18 and the other end opened into a chamber E formed between the cylinder section 3a of the cylinder body 3 and the outer periphery of the conical portion 4a of the valve 4. Numeral 20 designates a wheel; 21 a tire; 22 a brake assembly including brakeshoes etc., and mounted on the wheel 20; 23 a wheel cylinder. Numeral 24 designates a hydraulic pressure feedpipe having one end connected to the hydraulic pressure inlet port of the wheel cylinder 23 and the other end opened into the chamber B. A brake system known to the prior art is formed by the master cylinder 18, brake pedal 19, brake assembly 22, wheel cylinder 23 etc. Numeral 25 designates a peripheral wheel speed detecting circuit for producing a DC voltage proportional to the peripheral wheel speed; 26 a skid detector to detect the presence of a condition in which the passenger-conveying vehicle is likely to skid by virtue of operations such as a primary differentiation and a secondary differentiation of the DC voltage from the peripheral wheel speed detecting circuit 25.

Figure 2:
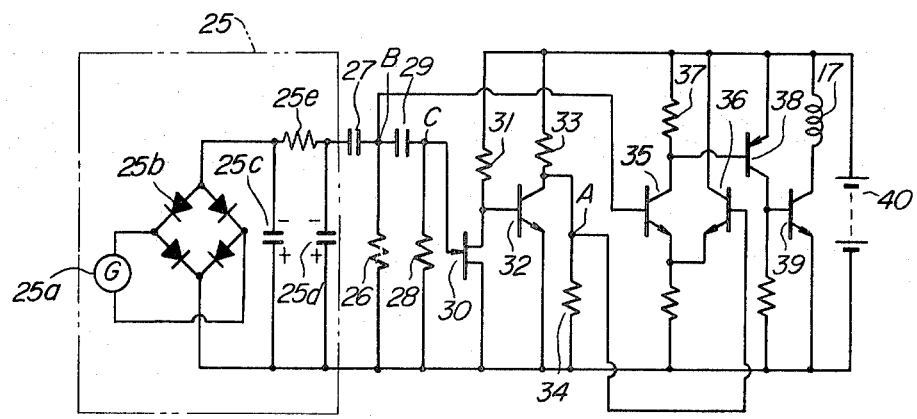
FIG. 2 is a wiring diagram showing an embodiment of the skid detector used in the device of the present invention.

Now the electrical circuits of the peripheral wheel speed detecting circuit 25 and the skid detector 26 will be explained in detail with reference to FIG. 2 in which the peripheral wheel speed detecting circuit 25 is composed of an AC generator 25a connected to a driving axle shaft to produce an AC voltage proportional to the peripheral wheel speed, a rectifier circuit 25b, smoothing capacitors 25c and 25d, and a smoothing resistor 25e. Numerals 26 and 27 designate a resistor and a capacitor respectively which constitute a primary differentiator circuit, and the time rate of change of the voltage drop across the smoothing capacitor 25d, that is, the peripheral wheel deceleration which is the time derivative of the peripheral wheel speed during the deceleration is taken out or detected by the primary differentiator circuit such that a deceleration voltage corresponding to said peripheral wheel deceleration is developed across the resistor 26. In this case, the peripheral wheel deceleration detecting circuit is composed of the peripheral wheel speed detecting circuit 25 and the primary differentiator circuit. Numerals 28 and 29 designate a resistor and a capacitor which form a secondary differentiator circuit, and the time rate of change of the deceleration voltage developed across the resistor 26 is taken out by this secondary differentiator circuit, that is, the peripheral wheel deceleration is differentiated with time to detect the peripheral wheel subdeceleration which corresponds in inverse portion to the adhesion coefficient of road such that a peripheral wheel subdeceleration voltage corresponding to the subdeceleration is developed across the resistor 28. The peripheral wheel subdeceleration detecting circuit is constructed by adding the secondary differentiator circuit to the peripheral wheel deceleration detecting circuit. Numeral 30 designates a field effect transistor with a high input impedance for amplifying the subdeceleration voltage appearing across the resistor 26, and this field effect transistor 30 may be replace with an emitter follower. Numeral 31 designates a load resistor of the field effect transistor 30; 32 a phase inverter transistor to change the phase of and amplify the amplified subdeceleration voltage developed across the load resistor 31. Numeral 33 designates a load resistor of the transistor 32; 34 a resistor which forms a voltage divider circuit with the load resistor 33. Numerals 35 and 36 designate a pair of transistors forming a differential amplifier circuit, and the deceleration voltage developed across the resistor 26 is applied to the base of the transistor 35 and to the base of the other transistor 36 is applied the voltage developed across the junction point A of the resistors 33 and 34 of the voltage divider circuit, that is, the voltage becomes inversely proportioned to the subdeceleration or more particularly the voltage which corresponds to the adhesion coefficient of the road. In this case, the voltage applied to the base of the transistor 36 represents the reference value of the peripheral wheel deceleration. Numeral 37 designates a load resistor of the transistor 35; 38 a transistor which amplifies the signal voltage appearing across the load resistor 37. Numeral 39 designates a transistor which amplifies the output current of the transistor 38 to actuate the braking force controlling mechanism, and the magnetic coil 17 is connected to the collector of this transistor 39. Numeral 40 designates a storage battery installed in the vehicle.

Now, with the arrangement described above, the operation of the device according to the present invention will be described hereinafter. During a constant speed running with no brakes being applied or during a normal driving for acceleration, no peripheral deceleration may develop in the wheel 20, and therefore the voltage across the junction point B of the resistor 26 and the capacitor 27 for the primary differentiation, which is the output terminal of the peripheral wheel deceleration detecting circuit for detecting the peripheral wheel deceleration, that is, the peripheral wheel speed voltage is either zero or negative and this zero or negative voltage is applied to the base of the transistor 35 of the differential amplifier. As a result, the transistor 35 is its cutoff state. Moreover, when there is no peripheral deceleration developed in the wheel 20, the voltage across the junction point C of the resistor 28 and the capacitor 29 for the secondary differentiation which is the output terminal of the peripheral wheel subdeceleration detecting circuit, that is, the peripheral wheel subdeceleration voltage is zero or positive. Therefore, the field effect transistor 30 to which this zero or positive voltage is applied has a close-to-conduction level between the drain and source thereof and its drain voltage has a very low value. Thus, the transistor 32 is cut off, and the voltage across the junction point A of the resistors 33 and 34 of the voltage divider circuit has a value derived by dividing the source voltage with the resistors 33 and 34. Thus, the transistor 36 to the base of which is applied the voltage across the junction joint A becomes conductive. This means that the output voltage of the differential amplifier composed of this transistor 36 and the transistor 35, that is, the collector voltage of the transistor 35 has a value close to that of the source voltage since the transistor 35 is nonconducting. Consequently, both transistors 38 and 39 are cut off and no current is supplied to the magnetic coil 17. Thus, the flapper 15 does not incline toward either of the nozzles 10 and 11, but it hangs down in the middle of the nozzles 10 and 11. Therefore, the hydraulic pressures delivered from the oil pump 2 and applied to both sides of the large diameter section 6c of the spool 6 through the manifold 8 and from the sides of the chambers C and D are equal to each other and, by the spring pressure of the spring 7, the spool 6 causes the base 6e of its small diameter section 6a to be pressed against and locked by the expanded base 4c of the valve 4. And in this pressed and locked position, the master cylinder 18 and the wheel cylinder 32 communicate with each other through the hydraulic pressure feed pipe 20a, the chambers E and B, and the hydraulic pressure feed pipe 24, whereby normal application of the brakes can be effected by pressing the brake pedal 19. Of course, the hydraulic pressure delivered by the oil pump 2 and the set load of the spring 7 are predetermined so that during normal brake application, the hydraulic pressure delivered from the master cylinder 18 will never be applied to the hydraulic pressure receiving surfaces of the small diameter section 6a and the intermediate diameter section 6b of the spool 6 to cause the spool 6 to move against the spring pressure of the spring 7.

Now, is the brake pedal 19 is pressed to apply the brakes to cause the passenger-carrying vehicle running at a high speed to slow down and run at a low speed or to come to a stop, the peripheral speed of the wheel 20 rapidly decreases with a certain peripheral deceleration by virtue of the braking operation of the brake system. This in turn results in a drop in the output voltage of the AC generator 25a and a consequent decrease in the voltage across the smoothing capacitor 25d. Whereupon, the time rate of change of the voltage across the capacitor 25d or the peripheral wheel deceleration is detected by means of the primary differentiator circuit composed of the resistor 26 and the capacitor 27 so that the peripheral wheel deceleration voltage corresponding to the thus-detected peripheral wheel deceleration appears across the resistor 26 with the polarity being positive on the side of the junction point B and simultaneously this peripheral wheel deceleration voltage is applied to the base of the transistor 35 of the differential amplifier circuit. On the other hand, the time rate of change of the peripheral wheel deceleration voltage developed across the resistor 26 or the peripheral wheel subdeceleration is detected by means of the secondary differentiator circuit composed of the resistor 28 and the capacitor 29 to thereby indirectly detect the friction coefficient between the road surface and the tire 21.

The reason why the friction coefficient between the road surface and the tire 21 can be indirectly detected by detecting the peripheral wheel subdeceleration will be explained hereinafter. To begin with, if the wheel 20 is urgently braked on a road surface such as a snowy frozen road surface where the adhesion coefficient is small, the peripheral wheel deceleration voltage is developed across the resistor 26 which is very large in magnitude and very abrupt, whereas on a road surface such as a dry asphalt road surface where the adhesion coefficient is large, emergency application of the brake to the wheel 20 produces across the resistor 26 the peripheral wheel deceleration voltage of slow and small magnitude. Accordingly, by differentiating the peripheral wheel deceleration voltage appearing across the resistor 26 by means of the secondary differentiator circuit composed of the resistor 28 and the capacitor 29 to detect the peripheral wheel subdeceleration, the friction coefficient between the road surface and the tire 21 can be indirectly detected.

Then, as the peripheral wheel subdeceleration voltage appearing across the resistor 28 with the polarity being negative on the side of the junction point C is applied to the gate of the field effect transistor 30, this field effect transistor 30 proceeds towards its cutoff state. Consequently, the drain voltage of the transistor 30 rises with a result that base current flows into the transistor 32 in response to this drain voltage and collector current whose current amplification is $\beta$ times the base current flows at the collector of the transistor 32. As a result, the voltage across the junction point A of the resistor 33 and 34 forming the voltage divider circuit becomes lower as compared with the voltage developed during the normal driving without any brake application. And the, the voltage across the junction point A which is inversely proportional to the peripheral wheel subdeceleration or the reference voltage corresponding to the friction coefficient between the road surface and the tire 21, is applied to the base of the other transistor 36 of the differential amplifier.

In this manner, the peripheral wheel deceleration voltage is applied to the base of the transistor 35 of the differential amplifier, and the reference voltage inversely proportional to the peripheral wheel subdeceleration voltage and corresponding to the friction coefficient between the road surface and the tire 21 is applied to the base of the other transistor 36. Thus, when the peripheral wheel deceleration voltage exceeds the said reference voltage, the differential amplifier delivers its output to energize the magnet coil 17 and it is to be noted here that in order to efficiently brake the passenger-conveying vehicle or to shorten the stopping distance, it will be an ideal mode of brake application to provide braking action in a direction to forcibly release part of the braking force of the brake system just before the wheel 20 locks. Accordingly, the present invention is also based on this ideal concept and thus, in order to prevent the braking force from being released considerably until the very moment that the wheel 20 is about to lock, the ohmic values of the resistors 33 and 34 of the voltage divider circuit are predetermined so that the reference voltage appearing across the junction point A of the resistors 33 and 34 may be controlled by the voltage-dividing ratio of the resistors 33 and 34 to thereby prevent the differential amplifier from delivering its output until about the very moment that the wheel 20 locks. Then, about the time when the wheel 20 is going to lock, the peripheral wheel deceleration voltage of very large magnitude appears across the resistor 26 and the peripheral wheel subdeceleration voltage of very large magnitude also appears across the resistor 28 with the polarity being negative on the side of the junction point C. When this happens, the field effect transistor 30 is completely cutoff and the transistor 32 becomes fully conductive. This results in a further decrease in the reference voltage developed across the junction point A of the resistors 33 and 34 of the voltage divider circuit, whereupon, as the peripheral wheel deceleration exceeds the reference value or the skid detector detects that the wheel 20 is about to lock, the collector voltage of the transistor 35 of the differential amplifier is dropped to a very low level to thereby conduct the transistors 38 and 39. Consequently, a current which corresponds to the magnitude of the peripheral wheel deceleration after having exceeded said reference value, is supplied to the magnet coil 17 causing the flapper 15 to incline toward the nozzle 11 in response to the current flowing through the magnet coil 17. This in turn increases the back pressure of the flapper 15 on the side of the nozzle 11, and the hydraulic pressure within the chamber D at the rear of the large diameter section 6c of the spool 6 continuously rises in response to the peripheral wheel deceleration. This causes the spool 6 to slide toward the chamber C as shown by a two-dot chain line in FIG. 1 against the spring pressure of the spring 7. Then, the valve 4 is urged to slide toward the cylinder portion 3b under the spring pressure of the spring 5 thereby closing the open end of this cylinder portion 3b. Consequently, the hydraulic pressure path from the master cylinder 18 to the wheel cylinder 23 is shut off and simultaneously the movement of the spool 6 causes the volume of the chamber B to continuously increase in accordance with the magnitude of the peripheral wheel deceleration. Thus, the hydraulic pressure in the wheel cylinder 23 continuously drops in response to the magnitude of travel of the spool 6 so that control is effected in a direction to release the braking force of the brake system even if the driver continues to press the brake pedal 19. When the peripheral wheel deceleration of the wheel 20 gradually decreases without locking the wheel 20 by virtue of the above braking force controlling operation and the peripheral wheel deceleration voltage across the resistor 26 decreases in response to the peripheral wheel deceleration until it becomes lower than the reference voltage developed across the junction point A of the resistors 33 and 34 of the voltage divider circuit, the output is no longer delivered from the differential amplifier circuit blocking the supply of current to the magnet coil 17. As a result, the flapper 15 now hangs down in the middle of the nozzles 10 and 11, the spool 6 is pressed toward the valve 4 under the spring pressure of the spring 7, and the base 6e of the small diameter section 6a of the spool 6 urges the valve 4 toward the end wall 3d of the cylinder body 3 against the spring force of the spring 5 returning the valve 4 into its normal position with no braking operation taking place. Thus the master cylinder 18 and the wheel cylinder 23 again communicates with each other. In this case, since the driver is still pressing the brake pedal 19, the braking force is applied again to the wheel 20 developing the peripheral deceleration in the wheel 20. Thereafter, whenever the peripheral wheel deceleration exceeds the reference value, the aforesaid antiskid operation is repeated so that the passenger-conveying vehicle may be safely and efficiently braked and stopped without the vehicle skidding due to the locking of the wheel 20.

It is evident from the foregoing that the gist of the present invention resides in that the reference value (the reference voltage developed across the junction point A of the resistors 33 and 34 of the voltage divider circuit and applied to the base of the transistor 36 of the differential amplifier) at which the antiskid device will be actuated is controlled to be inversely proportional to the peripheral wheel subdeceleration, whereby the reference value for controlling the peripheral wheel deceleration is controlled such that it is set to a small value such as corresponding to the coefficient of road adhesion, 0.1, on a snowy frozen road surface and the like where the friction coefficient between the road surface and the tires is small. While this reference value for controlling the peripheral wheel deceleration is set to a large value such as corresponding to the coefficient of road adhesion, 0.8, on a dry asphalt road surface and the like where the adhesion coefficiency is large, and thus the reference value for controlling the peripheral wheel deceleration may be changed in accordance with the adhesion coefficients of road surface.

In the embodiment described above, a DC voltage proportional to peripheral wheel speed is obtained by rectifying and smoothing out the AC output from the AC generator 25a connected to the driving axle shaft. However, it is possible to produce a pulse corresponding to the peripheral wheel speed from a rotary shaft such as a driving axle shaft correlated with the peripheral wheel speed by means of a pulse generator and the like and then apply this pulse to a D-A converting circuit to obtain the DC voltage proportional to the peripheral wheel speed. It is also possible to obtain the DC voltage proportional to the peripheral wheel speed by means of a DC generator coupled to a rotary shaft correlated with the peripheral wheel speed. Moreover, although the hydraulically operated braking force controlling mechanism is used in the illustrated embodiment of the present invention, any electrically or mechanically operated brake force controlling mechanisms may be employed likewise.

I claim:

1. An antiskid device comprising:
   a skid detector comprising a peripheral wheel deceleration detecting circuit means for providing an output signal proportional to wheel deceleration and a peripheral wheel subdeceleration detecting circuit means for differentiating the output signal from said peripheral wheel deceleration detecting circuit means to thereby detect the peripheral wheel subdeceleration as an output therefrom, and
   a braking force controlling means for controlling the braking force applied to the wheel, wherein said braking force controlling means is actuated to controllably release the braking force applied to the wheel when the output from said peripheral wheel deceleration detecting circuit exceeds a reference value which is varied in inverse proportion to the output from said peripheral wheel subdeceleration detecting circuit means.

2. A skid detector for use in a vehicle antiskid device which device includes brake force control means, said skid detector comprising:
   a wheel deceleration detecting means for producing a deceleration signal corresponding to the first order time derivative of vehicle wheel speed,
   a wheel subdeceleration detecting means for producing a subdeceleration signal corresponding to the second order time derivative of vehicle wheel speed and hence approximately inversely proportional to the instantaneous coefficient of friction existing between a road surface and the vehicle wheels
   comparing means connected to both of said detecting means and adapted for connection to said brake force control means for automatically controlling a release of applied vehicle braking force when the magnitude of said deceleration signal exceeds a reference value that is varied in inverse proportion to said subdeceleration signal.

3. A skid detector as in claim 2 wherein said subdeceleration detecting means comprises a time differentiating circuit connected to differentiate said deceleration signal from said deceleration detecting circuit means.

4. A skid detector as in claim 3 wherein said comparing means comprises a differential amplifier.

5. A skid detector as in claim 3 wherein said comparing means includes an inverting amplifier means for inverting said subdeceleration signal prior to a reference input of said differential amplifier.

6. A skid detector as in claim 5 wherein said inverting amplifier means includes a voltage divider means for adjusting the input signal level to said reference input of said differential amplifier.

* * * * *